(12) United States Patent
Huo et al.

(10) Patent No.: US 12,502,869 B2
(45) Date of Patent: Dec. 23, 2025

(54) BACK COVER OF ELECTRONIC DEVICE, AND ELECTRONIC DEVICE

(71) Applicant: Honor Device Co., Ltd., Shenzhen (CN)

(72) Inventors: Wenlong Huo, Shenzhen (CN); Bangshi Yin, Shenzhen (CN); Wenbo Wu, Shenzhen (CN); Chengjie Gao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 237 days.

(21) Appl. No.: 17/910,104

(22) PCT Filed: Apr. 18, 2022

(86) PCT No.: PCT/CN2022/087448
§ 371 (c)(1),
(2) Date: Sep. 8, 2022

(87) PCT Pub. No.: WO2023/015929
PCT Pub. Date: Feb. 16, 2023

(65) Prior Publication Data
US 2024/0198635 A1    Jun. 20, 2024

(30) Foreign Application Priority Data
Aug. 12, 2021 (CN) .......................... 202110922162.0

(51) Int. Cl.
H04M 1/02 (2006.01)
B32B 3/30 (2006.01)
B32B 5/02 (2006.01)
B32B 7/02 (2019.01)
(Continued)

(52) U.S. Cl.
CPC ................. B32B 15/14 (2013.01); B32B 3/30 (2013.01); B32B 5/02 (2013.01); B32B 7/02 (2013.01);
(Continued)

(58) Field of Classification Search
CPC .. B32B 15/14; B32B 3/30; B32B 5/02; B32B 7/02; B32B 7/12; B32B 9/025;
(Continued)

(56) References Cited

U.S. PATENT DOCUMENTS

2011/0117872 A1    5/2011   Tseng
2021/0168958 A1    6/2021   Choi et al.
2022/0329677 A1*  10/2022   Wu ........................ H01Q 1/243

FOREIGN PATENT DOCUMENTS

CN          2633805 Y     8/2004
CN          203165965 U   8/2013
(Continued)

*Primary Examiner* — Marcus Hammonds
(74) *Attorney, Agent, or Firm* — Slater Matsil, LLP

(57) ABSTRACT

A back cover of an electronic device and an electronic device are provided. The back cover of the electronic device includes: a first structure layer including a first region and a second region, where a thickness of the first region is greater than a thickness of the second region, the second region forms a second region orthographic projection along a thickness direction of the electronic device, a battery of the electronic device forms a battery orthographic projection along the thickness direction of the electronic device, and the second region orthographic projection includes the battery orthographic projection. The back cover can be adapted to a middle frame of an electronic device with a glass back cover.

20 Claims, 12 Drawing Sheets

(51) Int. Cl.
  *B32B 7/12* (2006.01)
  *B32B 9/02* (2006.01)
  *B32B 9/04* (2006.01)
  *B32B 15/14* (2006.01)
(52) U.S. Cl.
  CPC ............... *B32B 7/12* (2013.01); *B32B 9/025* (2013.01); *B32B 9/041* (2013.01); *H04M 1/0266* (2013.01); *B32B 2260/021* (2013.01); *B32B 2260/046* (2013.01); *B32B 2307/7376* (2023.05); *B32B 2457/00* (2013.01)
(58) Field of Classification Search
  CPC .............. B32B 9/041; B32B 2260/021; B32B 2260/046; B32B 2307/7376; B32B 2457/00; B32B 2255/205; B32B 3/04; B32B 2439/00; B32B 3/263; B32B 9/005; B32B 9/02; B32B 9/047; B32B 15/18; B32B 15/20; B32B 37/06; B32B 37/10; H04M 1/0266; H04M 1/0283; H04M 1/0262; H04M 1/0249; H04M 1/026; H04M 1/0279; H04M 1/185; Y02E 60/10
  See application file for complete search history.

(56) References Cited

FOREIGN PATENT DOCUMENTS

| | | |
|---|---|---|
| CN | 204334644 U | 5/2015 |
| CN | 205545429 U | 8/2016 |
| CN | 107465773 A | 12/2017 |
| CN | 110300198 A | 10/2019 |
| CN | 110336902 A | 10/2019 |
| CN | 110636158 A | 12/2019 |
| CN | 110774676 A | 2/2020 |
| CN | 111038133 A | 4/2020 |
| CN | 210692756 U | 6/2020 |
| CN | 211018910 U | 7/2020 |
| CN | 211152410 U | 7/2020 |
| CN | 112351121 A | 2/2021 |
| CN | 213661680 U | 7/2021 |
| CN | 114158208 A | 3/2022 |
| JP | 2012244280 A | 12/2012 |
| WO | 2019129095 A1 | 7/2019 |
| WO | 2021047659 A1 | 3/2021 |

\* cited by examiner

BACK COVER OF ELECTRONIC DEVICE, AND ELECTRONIC DEVICE

CROSS-REFERENCE TO RELATED APPLICATIONS

This application is a National Stage of International Application No. PCT/CN2022/087448, filed on Apr. 18, 2022, which claims priority to Chinese Patent Application No. 202110922162.0, filed on Aug. 12, 2021. Both of the aforementioned applications are hereby incorporated by reference in their entireties.

TECHNICAL FIELD

This application relates to the field of terminal devices, and in particular, to a back cover of an electronic device, and an electronic device.

BACKGROUND

Currently, back covers of some electronic devices are glass back covers, and the glass back cover has a feature of a thin thickness. A height of a middle frame of the electronic device on the market is correspondingly reduced to adapt to the glass back cover. With an ever-increasing personalized requirement of a user on the electronic device, a single glass back cover cannot meet the requirement of the user. To improve market competitiveness of the electronic device, a back cover of another material needs to be developed. However, the back cover of another material is thicker, and cannot be adapted to the middle frame of the electronic device with the glass back cover.

SUMMARY

To resolve the foregoing technical problem, this application provides a back cover of an electronic device, and an electronic device. In this method, a fiber composite material is used to prepare the back cover of the electronic device. The back cover of the electronic device is prepared to be in an unequal thickness structure in which a thickness bottleneck region facing a battery part of the electronic device is thin and another non-thickness bottleneck region is thick. This accordingly reduces a thickness of the back cover of the electronic device, so that the back cover of the electronic device can be adapted to a middle frame of an electronic device with a glass back cover.

According to a first aspect, this application provides a back cover of an electronic device. The back cover of the electronic device includes: a first structure layer including a first region and a second region, where a thickness of the first region is greater than a thickness of the second region, the second region forms a second region orthographic projection along a thickness direction of the electronic device, a battery of the electronic device forms a battery orthographic projection along the thickness direction of the electronic device, and the second region orthographic projection includes the battery orthographic projection. In this manner, the back cover of the electronic device is prepared to be in an unequal thickness structure in which a thickness bottleneck region facing a battery part of the electronic device is thin and another non-thickness bottleneck region is thick. This accordingly reduces a thickness of the back cover of the electronic device, so that the back cover of the electronic device can be adapted to a middle frame of an electronic device with a glass back cover.

For example, according to the back cover of the electronic device provided in the first aspect of this application, the first structure layer is a fiber composite board. A process of preparing and forming a back cover of this integrated fiber composite board is simple.

For example, according to the back cover of the electronic device provided in the first aspect of this application, the first region is a fiber composite board, and the second region is a metal substrate. The back cover formed by combining the metal substrate with the fiber composite board can further reduce a whole thickness of the thickness bottleneck region when rigidity of the metal substrate meets a condition.

For example, according to the back cover of the electronic device provided in the first aspect of this application, upper surfaces of the first region and the second region are located on a same horizontal plane; and an overlapped region between the first region and the second region is fixedly connected. The overlapped region may be located in the first region, or the overlapped region may be located in the second region, or may cross the first region and the second region. A fixed connection of the overlapped region can ensure reliability of a connection between the first region and the second region.

For example, according to the back cover of the electronic device provided in the first aspect of this application, the overlapped region between the first region and the second region is bonded and fixed by using an adhesive, or a precursor of the fiber composite board in the first region is hot pressed onto the metal substrate for thermosetting molding. The overlapped region is bonded and fixed by the adhesive, which has a simple process and good firmness. The precursor of the fiber composite board in the first region is hot pressed onto the metal substrate for thermosetting molding. After curing, combination is implemented through a molecular force between the fiber composite board and the metal substrate, and no adhesive is required.

For example, according to the back cover of the electronic device provided in the first aspect of this application, an overlapped region between the metal substrate and the fiber composite board is locally corroded. The overlapped region between the metal substrate and the fiber composite board is locally corroded, which can increase a binding force between the fiber composite board and the metal substrate in the overlapped region.

For example, according to the back cover of the electronic device provided in the first aspect of this application, an overlapped region between the metal substrate and the fiber composite board is locally dug. The overlapped region between the metal substrate and the fiber composite board is designed as locally dug, which can increase a binding force between the fiber composite board and the metal substrate in the overlapped region.

For example, a thickness range of the metal substrate in the first structure layer of the back cover of the electronic device provided in the first aspect of this application is 0.15 mm to 0.3 mm. The thickness of the metal substrate is set to 0.15 mm to 0.3 mm, which can further reduce a whole thickness of the thickness bottleneck region when rigidity of the metal substrate meets a condition. For example, the first region of the first structure layer provided in the first aspect of this application is a region bonded and fixed with a middle frame of the electronic device. In this optional embodiment, only a thickness of the region that is in the first structure layer and that is bonded and fixed to the middle frame is increased, so that the second region orthographic projection formed by the second region along the thickness direction of the electronic device has a larger area. Therefore, there is more accommodating space inside the electronic device. This back cover with the first structure layer of unequal thickness has a thin region at a back cover edge that is bonded and fixed to the middle frame of the electronic device, which can be adapted to an outer outline of the middle frame to which the glass back cover is adapted.

For example, a thickness of the first region of the first structure layer provided in the first aspect of this application gradually changes, and the thickness of the first region is thicker when the first region is farther from an outer edge of the middle frame. The first region is designed as a gradient thickness structure, to enable an appearance of the back cover of the electronic device to be more personalized and diversified.

For example, according to the back cover of the electronic device provided in the first aspect of this application, a thickness range of an outer edge of an adhesive region is 0.15 mm to 0.45 mm, so that the back cover in this embodiment of this application can be adapted to a same middle frame of an electronic device as the glass back cover.

For example, the back cover of the electronic device provided in the first aspect of this application further includes a second structure layer, and the second structure layer is located on an outer surface of the first structure layer. The second structure layer is disposed on the outer surface of the first structure layer, which can protect the first structure layer or decorate the back cover.

For example, the second structure layer provided in the first aspect of this application is a cover layer, and the cover layer is bonded and fixed to the first structure layer by using an adhesive layer. The cover layer is disposed on the outer surface of the first structure layer, which can improve both aesthetics of the back cover and a grip feeling of the electronic device. For example, the adhesive layer may be a double-sided tape or an adhesive, and a bonding process of the adhesive layer is simple and costs are low. For example, according to the back cover of the electronic device provided in the first aspect of this application, the cover layer includes vegan leather, genuine leather, bamboo leather, and the like. Cover layers of different materials have different hand feelings and appearances, and can be prepared to obtain different styles of back covers of electronic devices.

For example, according to the back cover of the electronic device provided in the first aspect of this application, a thickness of a third region of the cover layer covering the first structure layer gradually changes, the third region is in a predetermined distance away from the outer edge of the middle frame, the third region is a local region of the cover layer that is hot stamped by a stamping die, and the thickness of the third region is thicker when the third region is farther from the outer edge of the middle frame. A cover layer at an outer edge of the back cover is thinned, so that a thickness of the back cover edge is thinned, which is better adapted to the middle frame of the electronic device with the glass back cover.

For example, according to the back cover of the electronic device provided in the first aspect of this application, the first structure layer is provided with a protrusion near the outer edge of the middle frame, and an upper surface of the protrusion transitions smoothly with an embossed upper surface of the third region of the cover layer. The protrusion provided at the edge of the first structure layer can clamp the embossed cover layer, which can improve adhesive firmness between the cover layer and the first structure layer. Further, the upper surface of the protrusion transitions smoothly with the embossed upper surface of the third region of the cover layer, which can improve smoothness of an outer surface of the back cover. In this manner in which hot stamping is performed on a local region of a cover layer on an outer surface of a 2D back cover, a 2.5D effect can be presented on the back cover.

For example, the cover layer provided in the first aspect of this application is hot stamped by using a stamping die as a whole. In one aspect, the cover layer is hot stamped as a whole, which can further reduce a thickness of the cover layer, thereby reducing a whole thickness of the back cover. In still another aspect, a preset pattern can be prepared on the cover layer by hot stamping as a whole, so as to improve aesthetics of the back cover.

For example, the cover layer provided in the first aspect of this application is of equal thickness. A production process of the cover layer of equal thickness is simple.

For example, the first structure layer provided in the first aspect of this application is provided with a protrusion near the outer edge of the middle frame, and an upper surface of the protrusion transitions smoothly with an embossed upper surface of the cover layer. The protrusion provided at the edge of the first structure layer can clamp the embossed cover layer, which can improve adhesive firmness between the cover layer and the first structure layer. The upper surface of the protrusion transitions smoothly with the upper surface of the cover layer embossed as a whole, which can improve smoothness of an outer surface of the back cover.

For example, according to the back cover of the electronic device provided in the first aspect of this application, the second structure layer is a ceramic layer, and the ceramic layer covers the outer surface of the first structure layer. The first structure layer is set as an unequal thickness structure. This composite structure of the ceramic layer and the first structure layer of unequal thickness can decrease processing accuracy of a bonding surface of the ceramic layer, and can further enhance rigidity of four corners of a ceramic back cover, thereby improving whole reliability of the ceramic back cover.

For example, according to the back cover of the electronic device provided in the first aspect of this application, an adhesive surface of the first structure layer is bonded to an inner surface of the ceramic layer by using a hot pressing process. Bonding is implemented by using the hot pressing process, so that a bonding location has good stability.

For example, according to the back cover of the electronic device provided in the first aspect of this application, the first structure layer is bonded to an inner surface of the ceramic layer by using an adhesive layer, where the adhesive layer is a double-sided tape or an adhesive. A bonding process of bonding the two structure layers by using the adhesive layer is simple and costs are low.

For example, according to the back cover of the electronic device provided in the first aspect of this application, a ceramic layer covers the outer surface of the first structure layer. A thickness of the second region of the first structure layer is 0, that is, the first structure layer is of a structure with a hollow in the middle and a thickness around. The first structure layer of this structure is attached to inside of the ceramic layer. This can improve rigidity of four corners of a ceramic back cover, thereby improving whole reliability of the ceramic back cover.

For example, the second structure layer included in the back cover of the electronic device provided in the first aspect of this application is a decorative layer, and the decorative layer is a coating layer. The coating layer is simple in preparation process and is not easily detached from the first structure layer. The decorative layer disposed on the outer surface of the first structure layer can decorate the back cover.

According to a second aspect, this application provides an electronic device, where the electronic device includes a middle frame, a display screen, and any back cover of the electronic device according to the first aspect.

BRIEF DESCRIPTION OF THE DRAWINGS

FIG. 10a to FIG. 1c are exemplary schematic diagrams of a hot stamping process of vegan leather as a whole;

DETAILED DESCRIPTION OF ILLUSTRATIVE EMBODIMENTS

The technical solutions of the embodiments of this application are clearly and completely described below with reference to the accompanying drawings of the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The term "and/or" in the text merely describes an association relationship between associated objects, and indicates that three relationships may exist. For example, A and/or B may indicate the following three cases: Only A exists, both A and B exist, and only B exists.

The terms "first", "second", and the like in the specification and claims of the embodiments of this application are used to distinguish between different objects, and are not used to indicate a specific sequence of objects. For example, a first target object, a second target object, and the like are used to distinguish between different target objects, and are not used to indicate a specific order of target objects.

In the embodiments of this application, words such as "for example" or "such as" are used to indicate an example, illustration, or description. Any embodiment or design solution described as "for example" or "such as" in the embodiments of this application should not be explained as being preferred or advantageous over other embodiments or design solutions. Specifically, use of the words such as "for example" or "such as" is intended to present related concepts in a specific manner.

In the description of the embodiments of this application, unless otherwise stated, "a plurality of" means two or more. For example, a plurality of processing units refer to two or more processing units, and a plurality of systems refer to two or more systems.

Figure 1:
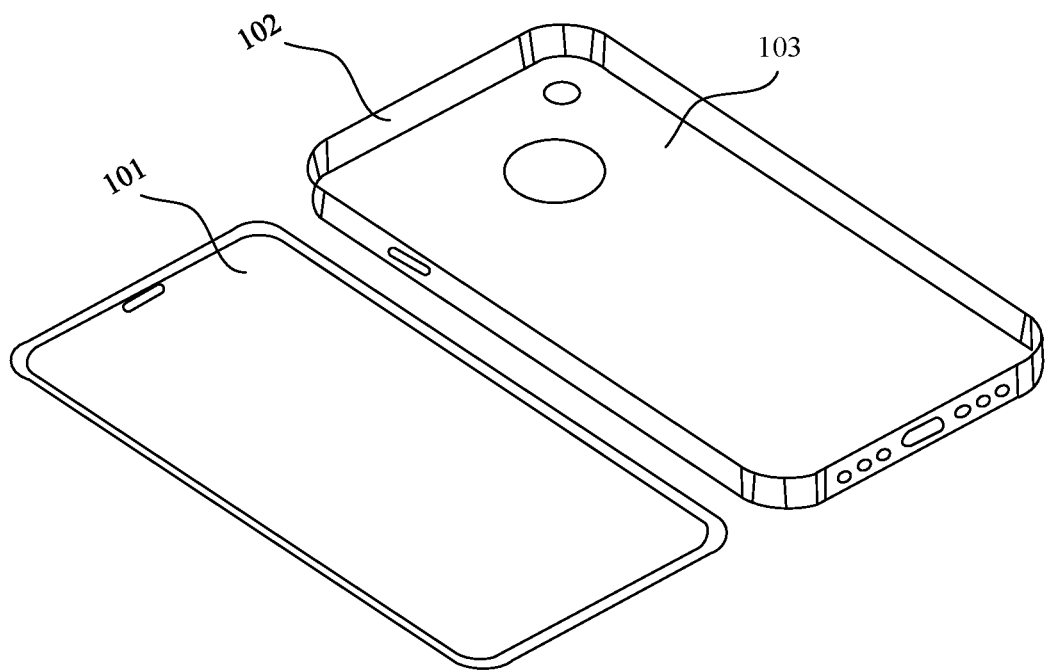
FIG. 1 is an exemplary schematic diagram of a hardware structure of an electronic device.

FIG. 1 is a schematic diagram of a structure of an electronic device. It should be understood that the electronic device shown in FIG. 1 is only an example of an electronic device. In addition, the electronic device may have more or fewer components than those shown in the figure, and may combine two or more components, or may have different component configurations. Various components shown in FIG. 1 may be implemented in hardware, software, or a combination of hardware and software including one or more signal processing and/or application specific integrated circuits.

In embodiments of this application, the electronic device may be a mobile terminal, for example, a mobile phone, a tablet computer, a wearable device, a vehicle-mounted device, an augmented reality (augmented reality, AR)/a virtual reality (virtual reality, VR) device, a notebook computer, an ultra-mobile personal computer (ultra-mobile personal computer, UMPC), a netbook, or a personal digital assistant (personal digital assistant, PDA), or may be a professional photography device, for example, a digital camera, a digital single lens reflex/micro digital single lens reflex, a motion camera, a pan-tilt-zoom camera, or an unmanned aerial vehicle. A specific type of the terminal device is not limited in the embodiments of this application.

The following uses a mobile phone as an example to describe an embodiment of this application. As shown in FIG. 1, the electronic device includes a display screen 101, a middle frame 102, and a back cover 103. The display screen 101 and the back cover 103 are nested in the middle frame, to constitute a housing structure of the electronic device. It should be noted that, FIG. 1 merely exemplarily describes the housing structure of the electronic device. In addition to the housing structure, the electronic device may further include internal hardware, a processor, an external memory interface, an internal memory, a universal serial bus (universal serial bus, USB) interface, a charging management module, a power management module, a battery, an antenna, a mobile communication module, a wireless communication module, an audio module, a loudspeaker, a receiver, a microphone, a headset jack, a sensor module, a key, a motor, an indicator, a camera, and the like. The listed internal hardware is not shown in FIG. 1.

In this embodiment of this application, the back cover 103 of the electronic device may be of any structure shown in subsequent embodiments, for example, a structure of a first structure layer of unequal thickness, a composite structure of a first structure layer of unequal thickness and a cover layer, a composite structure of a first structure layer of unequal thickness and a decorative layer, or a composite structure of an unequal-thickness fiber composite board and a ceramic layer, so that the back cover of the electronic device in this embodiment of this application can be adapted to the middle frame of the electronic device with the glass back cover.

Figure 2:
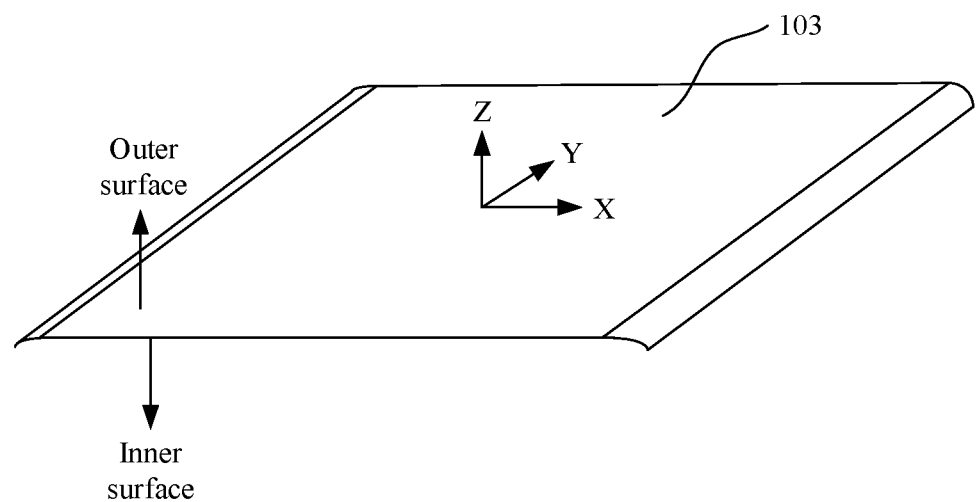
FIG. 2 is an exemplary schematic diagram of a structure of a back cover of an electronic device.

The following briefly describes the back cover of the electronic device in this embodiment of this application with reference to FIG. 2.

FIG. 2 shows the back cover 103 of the electronic device in a three-dimensional coordinate system of X, Y, and Z. A Z-axis positive direction is a direction toward an outer surface of the back cover 103 of the electronic device (that is, a backward direction of the electronic device). A Z-axis negative direction is a direction toward an inner surface of the back cover 103 of the electronic device (that is, a forward direction of the electronic device). A thickness direction of the back cover is the Z-axis direction. The back cover 103 of the electronic device may be of a single-layer structure or may be of a multi-layer composite structure. The back cover of the single-layer structure includes only a first structure layer. The first structure layer may be a fiber composite board or a combined structure of a fiber composite board and a metal substrate. The multi-layer structure includes a first structure layer and a second structure layer. The second structure layer is located on an outer surface of the first structure layer. The first structure layer may be a fiber composite board or a combined structure of a fiber composite board and a metal substrate. The second structure layer may include a cover layer, a decorative layer, and a ceramic layer. The following describes a detailed structure of the back cover in the coordinate system defined in FIG. 2 with reference to FIG. 3 to FIG. 13.

The following uses an example in which the first structure layer is a fiber composite board for description.

To balance three dimensions of rigidity, thickness, and appearance of the back cover, and improve competitiveness of the back cover, this embodiment of this application proposes a composite material back cover of an electronic device with an unequal-thickness fiber composite board as a base material. By using an unequal-thickness fiber composite board structure, the thickness of the back cover can be fully thinned, the rigidity of the back cover can be increased, and an are form of the back cover is adapted to the middle frame of the glass back cover, so as to share the middle frame with the glass back cover. Usually, a whole thickness of the electronic device is limited to some locations. These locations restricting the whole thickness become thickness bottlenecks. In this embodiment of this application, a thickness design value of the back cover for a thickness bottleneck region is small. For a non-thickness bottleneck region, because space underneath an inner surface of the back cover is relatively sufficient, a protrusion can be designed on the inner surface of the back cover.

Figure 3:
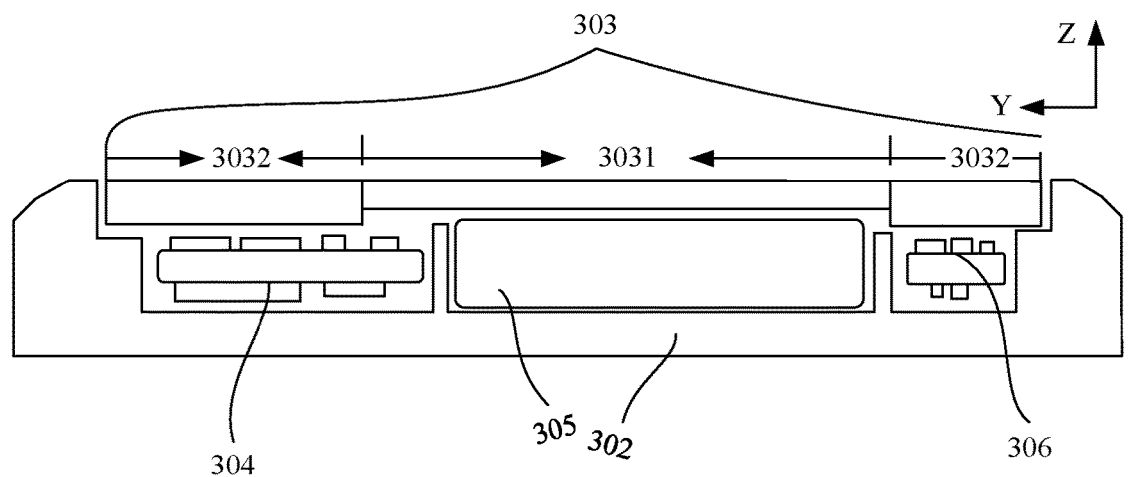
FIG. 3 is an exemplary schematic diagram of a structure of a back cover of an electronic device.

For example, refer to a schematic diagram of a structure of a back cover of an electronic device in FIG. 3. FIG. 3 is a schematic diagram of a Y-Z cross-section of the back cover of the electronic device. A back cover 303 is of an unequal thickness structure. The back cover 303 may be a fiber composite board of a fiber reinforced resin base material, a polyurethane substrate, a polyurethane fiber composite board, a substrate of an ABS resin material, or the like. In the fiber reinforced resin material, fiber is used as a reinforcing material, and resin is used as a base. The fiber reinforced resin material has features of strong impact resistance, easy processing, strong rigidity, and the like. An ABS resin is one of five synthetic resins, and has advantages of impact resistance, heat resistance, low-temperature resistance, chemical resistance, easy processing, stable product size, surface gloss, easy coating, easy coloring, and the like. In the embodiments of this application, that the back cover is based on the fiber composite board is used as an example for subsequent description. A back cover prepared by the fiber composite board is briefly referred to as a fiber composite back cover in description of subsequent embodiments.

Referring to FIG. 3, the back cover 303 is of an unequal-thickness fiber composite board structure. The back cover 303 includes a first region 3031 and a second region 3032. The second region 3032 forms a second region orthographic projection in a thickness direction of the electronic device. A battery 305 of the electronic device forms a battery orthographic projection in the thickness direction of the electronic device. The second region orthographic projection includes the battery orthographic projection. After the back cover 303 is disposed in a middle frame 302 of the electronic device, the first region 3031 that is in the back cover 303 and that is corresponding to the battery 305 is a thickness bottleneck region, and is used to accommodate relatively thick components, such as the battery. The second region 3032 corresponding to a main board 304 and a sub-board 306 is a non-thickness bottleneck region, and is used to accommodate relatively thin components, such as the main board and the sub-board. A thickness of the first region in the back cover 303 is less than a thickness of the second region thereof. Further, upper surfaces of the first region and the second region are located on a same horizontal plane. In an optional embodiment, the thickness of the first region may be set to 0.2 mm to 0.5 mm. The thickness of the first region is set to 0.2 mm to 0.5 mm, which can meet a rigidity requirement for the first region while reducing a whole thickness of the thickness bottleneck region. The thickness of the second region may be flexibly set based on a height of a matched middle frame, and heights of the main board and the sub-board. This is not limited in this application. The second region is a region in the first structure layer except the first region.

In this exemplary back cover structure, on the one hand, it helps improve whole rigidity of the back cover when the whole thickness of the electronic device remains unchanged. On the other hand, because the second region of the back cover is thick in edge and thin in middle, an extra gap between the inner surface of the back cover and each of the main board and the sub-board is reduced. This can reduce a whole press-type variable of the electronic device, and improve a grip feeling of the back cover.

Figure 4:
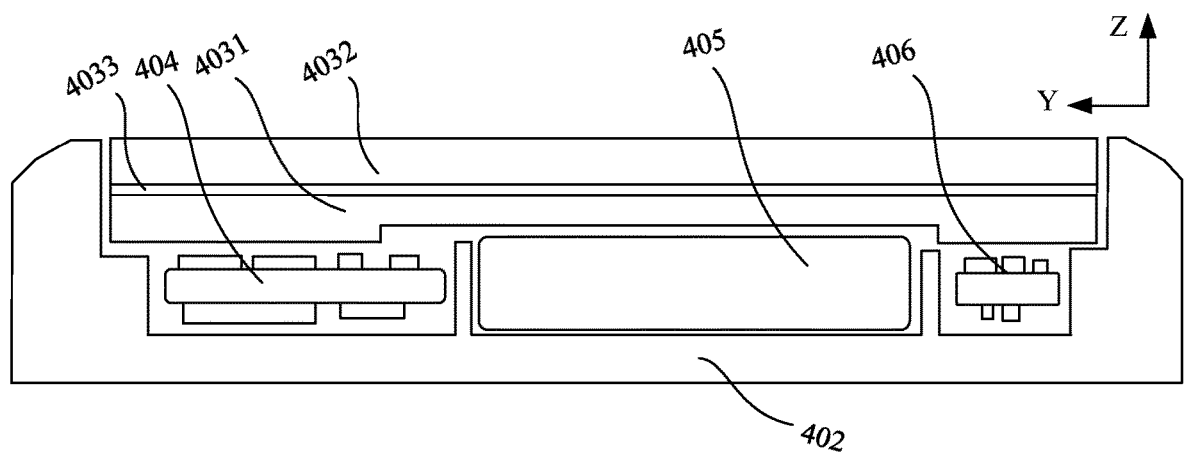
FIG. 4 is an exemplary schematic diagram of a structure of a back cover of an electronic device.

To improve aesthetics and the grip feeling of the back cover of the electronic device, vegan leather may be further used to cover the fiber composite layer of unequal thickness shown in FIG. 3. In the following, that the first structure layer is an unequal-thickness fiber composite board and the second structure layer is vegan leather is used as an example for description. For example, refer to a schematic diagram of a structure of a back cover of an electronic device in FIG. 4. FIG. 4 is a schematic diagram of a Y-Z cross-section of the back cover of the electronic device. A composite layer structure of an unequal-thickness fiber composite board 4031 and vegan leather 4032 composes the back cover of the electronic device. The unequal-thickness fiber composite board 4031 is bonded and fixed to the vegan leather 4032 by using an adhesive layer 4033. The adhesive layer 4033 may be filled with adhesive or may be double-sided tape. The vegan leather 4032, as a cover layer of the back cover, can not only protect the unequal-thickness fiber composite board 4031, but also can play a decorative role. The vegan leather 4032 may alternatively be replaced with polyurethane, PU for short, genuine leather, bamboo leather, or another material. In addition, the cover layer may be a coating layer. The vegan leather 4032 may be of an equal thickness structure as shown in FIG. 4, or may be of an unequal thickness structure.

After the back cover of the electronic device is disposed in a middle frame 402 of the electronic device, a first region of the unequal-thickness fiber composite board 4031 is corresponding to a battery 405. A second region of the unequal-thickness fiber composite board is corresponding to a main board 404 and a sub-board 406 of the electronic device separately. A thickness of the first region is less than a thickness of the second region.

In this optional manner of covering an outer surface of the unequal-thickness fiber composite board with the vegan leather, both the aesthetics of the back cover of the electronic device and the grip feeling of the back cover can be improved. When the back cover 303 is the unequal-thickness fiber composite board, the thickness of the second region of the back cover 303 may be reduced to 0.2 mm to 0.5 mm due to an opposite relationship between thickness and rigidity of the fiber composite board. To further reduce the thickness of the back cover, the back cover may be further set to have a combined structure of a fiber composite board and a metal substrate. The metal substrate is used to replace the second region of the fiber composite board. A back cover of this structure includes a first structure layer. A first region of the first structure layer is a fiber composite board, and a second region thereof is a metal substrate.

Figure 5:
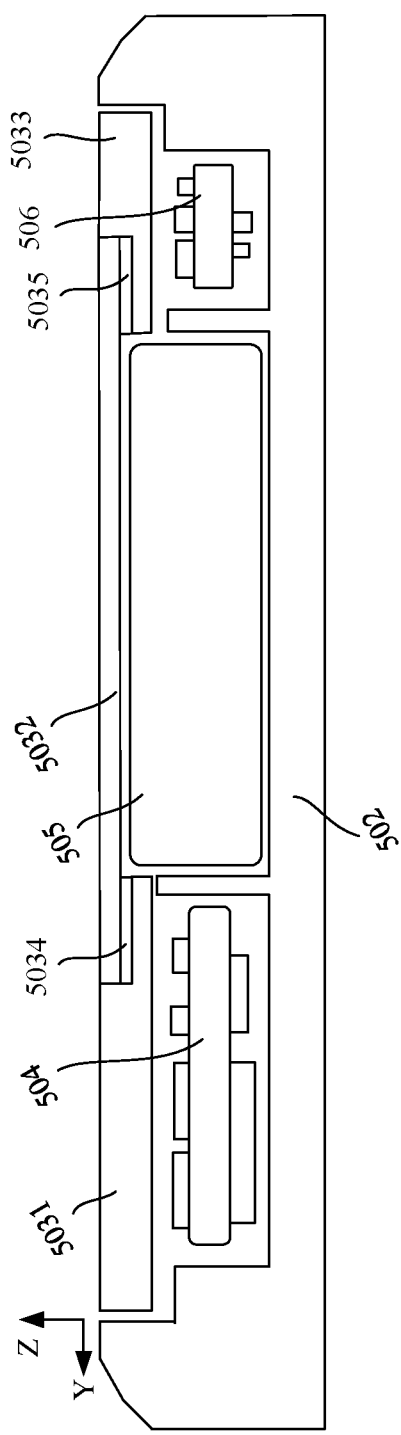
FIG. 5 is an exemplary schematic diagram of a structure of a back cover of an electronic device.

For example, refer to a schematic diagram of a structure of a back cover of an electronic device in FIG. 5. FIG. 5 is a schematic diagram of a Y-Z cross-section of the back cover of the electronic device. The back cover is of a single-layer unequal thickness structure. The back cover is mainly formed by splicing a first fiber composite board 5031, a metal substrate 5032, and a second fiber composite board 5033. Upper surfaces of the metal substrate 5032, the first fiber composite board 5031, and the second fiber composite board 5033 are on a same horizontal plane. An overlapped region between the metal substrate 5032 and the first fiber composite board 5031 and an overlapped region between the metal substrate 5032 and the second fiber composite board 5033 are fixedly connected. After the back cover is disposed in a middle frame 502 of the electronic device, an orthographic projection of the first fiber composite board 5031 in a thickness direction of the electronic device, that is, a Z direction, includes an orthographic projection of a main board 504 in the Z direction, an orthographic projection of the metal substrate 5032 in the Z direction includes an orthographic projection of a battery 505 in the Z direction, and a projection of the second fiber composite board 5033 includes a projection of a sub-board 506. A region corresponding to the metal substrate 5032 is a thickness bottleneck region. Regions corresponding to the first fiber composite board 5031 and the second fiber composite board 5033 are non-thickness bottleneck regions. A thickness of the metal substrate 5032 is less than thicknesses of the first fiber composite board 5031 and the second fiber composite board 5033.

The metal substrate may include but is not limited to a stainless steel substrate, an aluminum alloy substrate, and the like. The thickness of the metal substrate may be set to 0.2 mm to 0.5 mm, or may be set to be less than 0.2 mm. In an optional embodiment, the thickness of the metal substrate is set to 0.15 mm to 0.3 mm. When the metal substrate is used as the second region of the first structure layer, and the first fiber composite board and the second fiber composite board are used as the first region of the first structure layer, FIG. 5 merely exemplifies a setting manner in which the overlapped region is located in the first region. In an actual implementation process, the overlapped region may be located in the second region or may cross the first region and the second region. The metal substrate 5032, the first fiber composite board 5031, and the second fiber composite board 5033 in the overlapped regions may be bonded by using a colloid, for example, an adhesive or a double-sided tape, or may be spliced by using a metal-polymer splicing process such as an in-mold decoration process. For example, still referring to FIG. 5, the overlapped region between the metal substrate 5032 and the first fiber composite board 5031 is bonded and fixed by using a first double-sided tape 5034. The overlapped region between the metal substrate 5032 and the second fiber composite board 5031 is bonded and fixed by using a second double-sided tape 5035. In an optional embodiment, adhesive widths of the first double-sided tape 5034 and the second double-sided tape 5035 are 0.7 mm to 3.5 mm, for example, the adhesive width is a length along a Y-axis direction, and an adhesive layer thickness is 0.05 mm to 0.3 mm. When the first fiber composite board 5031, the metal substrate 5032, and the second fiber composite board 5033 are bonded by using the adhesive, an adhesive width of 0.7 mm to 3.5 mm and an adhesive layer thickness of 0.05 mm to 0.3 mm may also be controlled. When the adhesive width and the adhesive layer thickness are controlled within the foregoing optional range, in addition to ensuring adhesive stability, an impact of the adhesive layer thickness on the whole thickness of the electronic device can be minimized. Optionally, a first region and a second region on a lower surface of the metal substrate 5032 are locally corroded or locally dug, which can increase a binding force between the fiber composite board and the metal substrate.

In an optional embodiment, in addition to the manner list above in which the overlapped regions of the first fiber composite board, the second fiber composite board, and the metal substrate are bonded by using the adhesive, precursors of the first fiber composite board and the second fiber composite board may be hot pressed onto the metal substrate for thermosetting molding. After curing, a region in which the first fiber composite board contacts the lower surface of the metal substrate forms an overlapped region, and a region in which the second fiber composite board contacts the lower surface of the metal substrate forms an overlapped region. After curing, the fiber composite board and the metal substrate that are in the overlapped region are combined through a molecular force between the fiber composite board and the metal substrate, and no adhesive is required. A precursor is an existence form before a target product is obtained. Most of precursors exist in a form of organic-inorganic complexes or mixtures. Some of the precursors exist in a form of sol. In this embodiment of this application, the precursor of the fiber composite board is an existence form before the fiber composite board is prepared and formed. For fiber composite boards of different materials or in different ratios of materials, there are different precursors of the fiber composite boards.

This back cover of the single layer structure that combines the metal substrate with the fiber composite board can further reduce a whole thickness of the thickness bottleneck region when rigidity of the metal substrate meets a condition. The thickness of the second region may be flexibly set based on a height of a matched middle frame, and heights of the main board and the sub-board.

Figure 6:
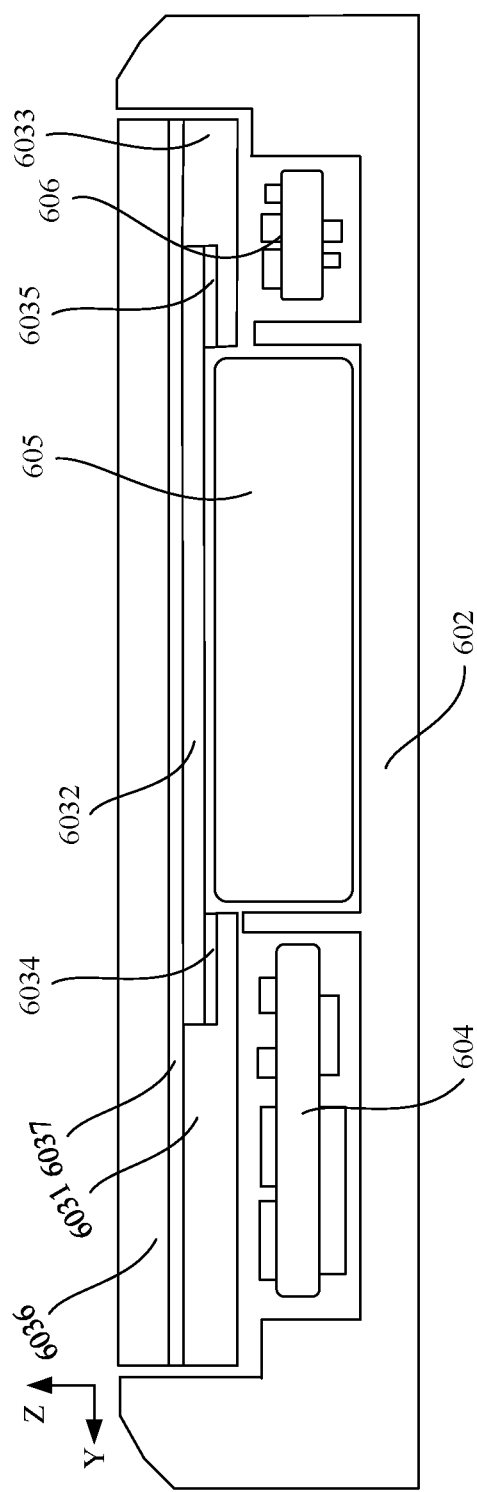
FIG. 6 is an exemplary schematic diagram of a structure of a back cover of an electronic device.

For example, refer to a schematic diagram of a structure of a back cover of an electronic device in FIG. 6. FIG. 6 is a schematic diagram of a Y-Z cross-section of the back cover of the electronic device. The back cover is of a dual layer structure. The dual layer structure includes a first structure layer of unequal thickness and a second structure layer. For example, the first structure layer is mainly formed by splicing a first fiber composite board 6031, a metal substrate 6032, and a second fiber composite board 6033, and is used as an inner layer of the back cover; and the second structure layer is vegan leather 6036, and is used as an outer layer of the back cover. The first structure layer and the vegan leather 6036 may be bonded and fixed by using an adhesive layer 6037, or may be bonded and fixed by using a double-sided tape. After the back cover is disposed in a middle frame 602 of the electronic device, an orthographic projection of the first fiber composite board 6031 in the Z direction includes an orthographic projection of a main board 604 in the Z direction, an orthographic projection of the metal substrate 6032 in the Z direction includes an orthographic projection of a battery 605 in the Z direction, and an orthographic projection of the second fiber composite board 6033 in the Z direction includes an orthographic projection of a sub-board 606 in the Z direction. A region corresponding to the metal substrate 6032 is a thickness bottleneck region. Regions corresponding to the first fiber composite board 6031 and the second fiber composite board 6033 are non-thickness bottleneck regions. A thickness of the metal substrate 6032 is less than thicknesses of the first fiber composite board 6031 and the second fiber composite board 6033.

The metal substrate may include but is not limited to a stainless steel substrate, an aluminum alloy substrate, and the like. In an optional embodiment, the thickness of the metal substrate is set to 0.15 mm to 0.3 mm. The thickness of the metal substrate is set to 0.15 mm to 0.3 mm, which can further reduce a whole thickness of the thickness bottleneck region when rigidity of the metal substrate 6032 meets a condition. The vegan leather 6036, as a cover layer of the back cover, may alternatively be replaced with polyurethane, PU for short, genuine leather, bamboo leather, or another material. In this optional manner in which the first structure layer spliced by the fiber composite board and the metal substrate forms a composite structure with the vegan leather, both the aesthetics of the back cover of the electronic device and the grip feeling of the back cover can be improved.

For example, still referring to FIG. 6, an overlapped region between the metal substrate 6032 and the first fiber composite board 6031 is bonded and fixed by using a first double-sided tape 6034. An overlapped region between the metal substrate 6032 and the second fiber composite board 6031 is bonded and fixed by using a second double-sided tape 6035. In an optional embodiment, adhesive widths of the first double-sided tape 6034 and the second double-sided tape 6035 are 0.7 mm to 3.5 mm, for example, the adhesive width is a length along a Y-axis direction, and an adhesive layer thickness is 0.05 mm to 0.3 mm. When the first fiber composite board 5031, the metal substrate 5032, and the second fiber composite board 6033 are bonded by using an adhesive, an adhesive width of 0.7 mm to 3.5 mm and an adhesive layer thickness of 0.05 mm to 0.3 mm may also be controlled. When the adhesive width and the adhesive layer thickness are controlled within the foregoing optional range, in addition to ensuring adhesive stability, an impact of the adhesive layer thickness on the whole thickness of the electronic device can be minimized.

Figure 7:
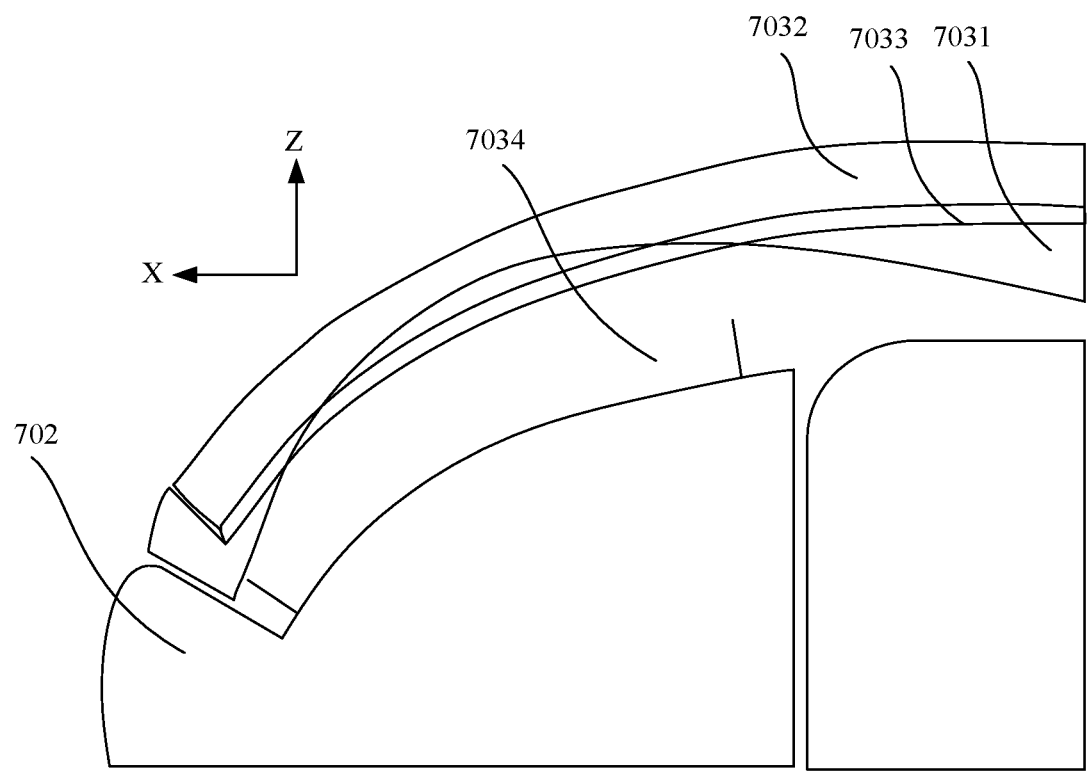
FIG. 7 is an exemplary schematic diagram of a structure of a back cover of an electronic device.

In addition to the foregoing structures shown in FIG. 3 to FIG. 6 in which the thickness bottleneck region in the back cover is thinned, to implement that the fiber composite back cover and the glass back cover are adaptable to a same electronic device frame, a thickness of the fiber composite board in an adhesive region may be further thinned gradually. Finally, the thickness of the back cover is thinned from a center to an edge in sequence. The adhesive region of the fiber composite board is a first region of the unequal-thickness fiber composite board. FIG. 7 is an exemplary schematic diagram of a structure of a back cover of an electronic device. FIG. 7 is a schematic diagram of an X-Z cross-section of the back cover of the electronic device. The back cover is of a composite layer structure of a fiber composite board 7031 and vegan leather 7032. The fiber composite board 7031 and the vegan leather 7032 are bonded and fixed by using an adhesive layer 7033. Optionally, the adhesive layer 7033 may further be replaced with a double-sided tape.

Figure 8:
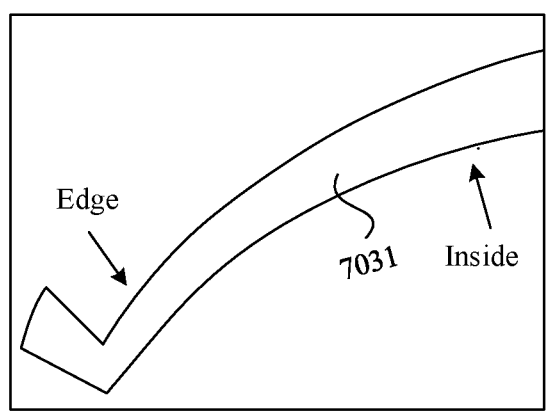
FIG. 8 is an exemplary schematic diagram of gradient thickness of a fiber composite board.

After the back cover is disposed in a middle frame 702 of the electronic device, the fiber composite board 7031 and the middle frame 702 are bonded by using a double-sided tape 7034. A region in which the fiber composite board 7031 is bonded to the double-sided tape is an adhesive region. A thickness of the adhesive region is gradually changed, and gradually increases from a back cover edge to a back cover center. That is, the thickness of the adhesive region is thicker when the adhesive region is farther from an outer edge of the middle frame. The vegan leather 7032 has an even thickness. The middle frame is a frame with a thickness. An inner edge of the middle frame is bonded and fixed to the back cover and a display screen, and the outer edge of the middle frame is exposed outside a device body. It should be noted that, the vegan leather 7032 may alternatively be prepared into a concave and convex appearance, so that the back cover is more individualized and attractive. FIG. 8 is a schematic diagram of a gradual thickness change of a fiber composite board. As shown in FIG. 8, a thickness of the fiber composite board is positively correlated with a distance between the fiber composite board and the outer edge of the middle frame. A smaller distance indicates a thinner thickness, and a larger distance indicates a thicker thickness. An effect is presented as thinning of the outer edge of the fiber composite board and thickening of an inner thickness. A maximum thickness of a center of the fiber composite board may be set by a person skilled in the art based on an actual requirement. A thicker center of the fiber composite board indicates a greater height difference between the back cover edge and the back cover center, and a more obvious protrusion of the back cover center. A thickness of an outermost edge of the fiber composite board is 0.15 mm to 0.45 mm. The thickness of the outermost edge of the fiber composite board is set to 0.15 mm to 0.45 mm, so that the back cover in this embodiment of this application can be adapted to a same middle frame of an electronic device as the glass back cover.

Figure 9A:
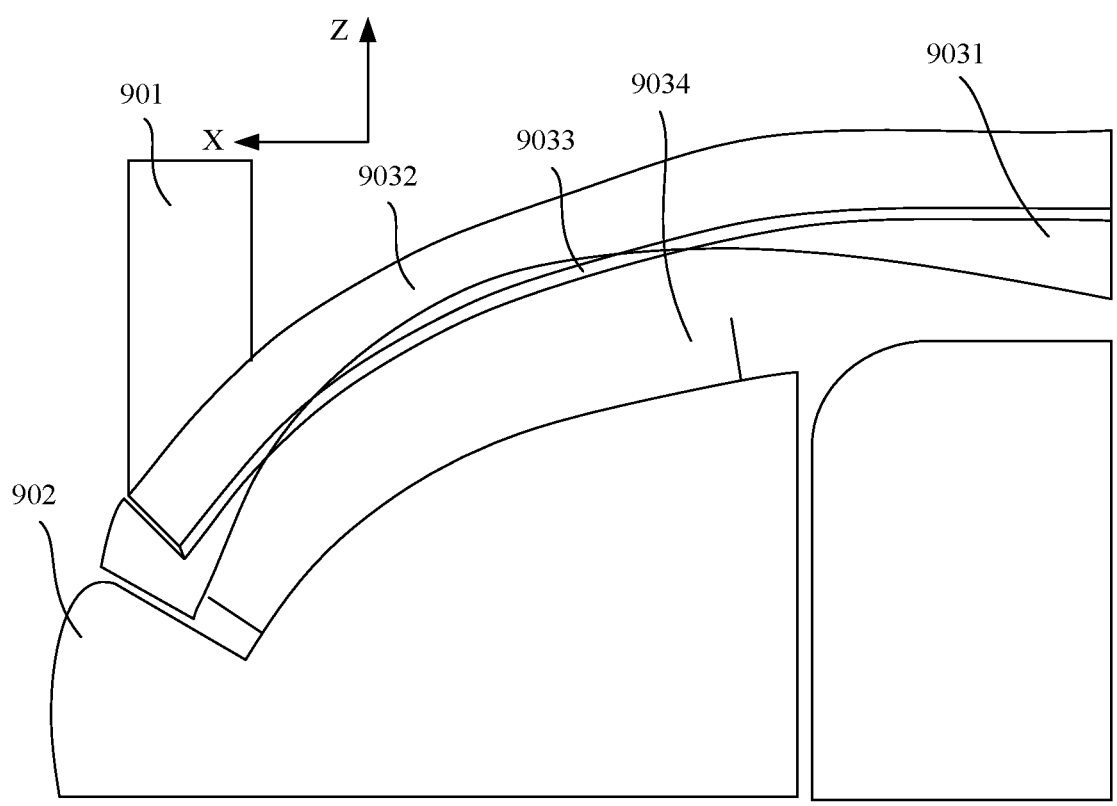
FIG. 9a and FIG. 9b are exemplary schematic diagrams of a hot stamping process of a local part of vegan leather.
Figure 9B:
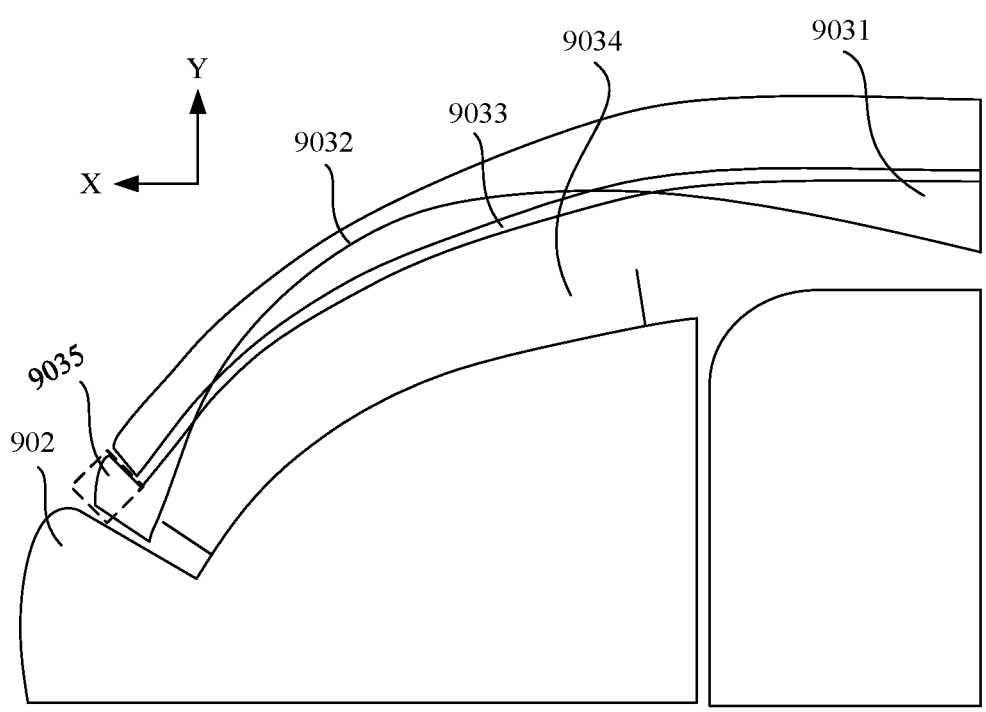

An embodiment of this application further provides a back cover of a composite layer structure of an unequal-thickness fiber composite board and unequal thickness vegan leather. For the back cover, vegan leather covers an outer surface of the unequal-thickness fiber composite board, and after the vegan leather is locally hot stamped, the vegan leather presents an unequal thickness shape. For example, a hot stamping process of the back cover in this embodiment is shown in schematic diagrams of a hot stamping process of a local part of vegan leather in FIGS. 9a and 9b. FIGS. 9a and 9b are schematic diagrams of an X-Z cross-section of a back cover of an electronic device. As shown in FIG. 9a, the back cover is of a composite layer structure of an unequal-thickness fiber composite board 9031 and vegan leather 9032, and the fiber composite board 9031 and the vegan leather 9032 are bonded and fixed by using an adhesive layer 9033. The fiber composite board 9031 and a middle frame 902 are fixed and bonded by using a double-sided tape 9034. For related descriptions of a gradient thickness of the unequal-thickness fiber composite board 9031, refer to related descriptions in the embodiment shown in FIG. 7. During preparation of the unequal thickness vegan leather, a stamping die 901 is placed above a to-be-stamped region of the vegan leather 9032. FIG. 9b is a schematic diagram of a structure of the back cover obtained after being hot stamped by using the stamping die. After hot stamping by using the stamping die is performed, the thickness of the unequal-thickness fiber composite board 9031 does not change, and a local region that is of the vegan leather 9032 and that is hot stamped by using the stamping die is a third region. The third region may alternatively be referred to as a thickness reduction region of a hot stamping region. The third region is in a predetermined distance away from an outer edge of the middle frame. A specific value of the predetermined distance may be set by a person skilled in the art based on an actual requirement. For example, the third region is disposed in a middle part on an outer surface of the vegan leather, or the third region is disposed in a part that is on the outer surface of the vegan leather and that is near the outer edge of the middle frame. For example, a region in which an edge of the vegan leather 9032 is hot stamped by the stamping die is the third region. A thickness of the vegan leather in the third region is thicker when the vegan leather in the third region is farther from the outer edge of the middle frame. The vegan leather 9032 is used as a cover layer of the back cover, and the vegan leather 9032 may alternatively be replaced with polyurethane, PU for short, genuine leather, bamboo leather, or another material. As shown in FIG. 9*b*, the first structure layer is provided with a protrusion 9035 near the outer edge of the middle frame. The protrusion 9035 is a part circled by a dashed box in FIG. 9*b*. An upper surface of the protrusion transitions smoothly with an embossed upper surface of the third region of the cover layer. A size of the protrusion may be flexibly set based on the thickness of the vegan leather layer. The protrusion provided at the edge of the first structure layer can clamp the embossed cover layer, which can improve adhesive firmness between the cover layer and the first structure layer. Further, the upper surface of the protrusion transitions smoothly with the embossed upper surface of the third region of the cover layer, which can improve smoothness of the outer surface of the back cover.

In this optional embodiment, the vegan leather is prepared into the unequal thickness structure by using the stamping die, and the vegan leather at an outer edge of the back cover is thinned, so that the thickness of the back cover edge is thinned, which is better adapted to the middle frame of the electronic device with the glass back cover.

Figure 10A:
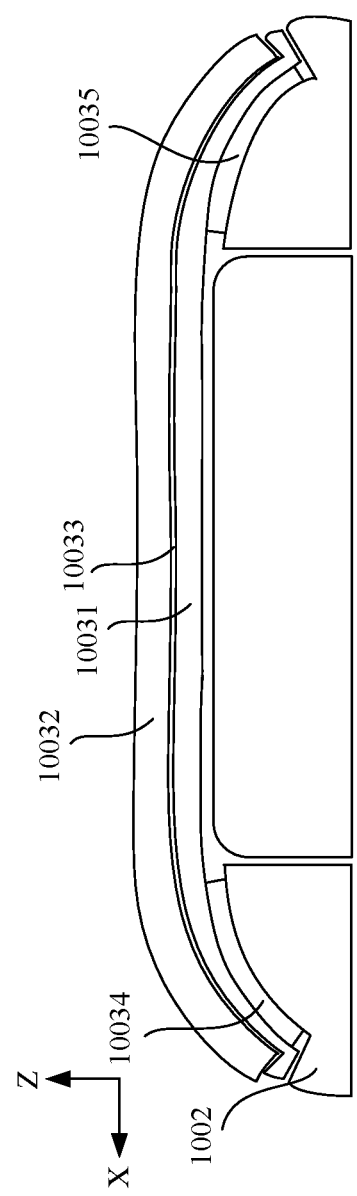
Figure 10B:
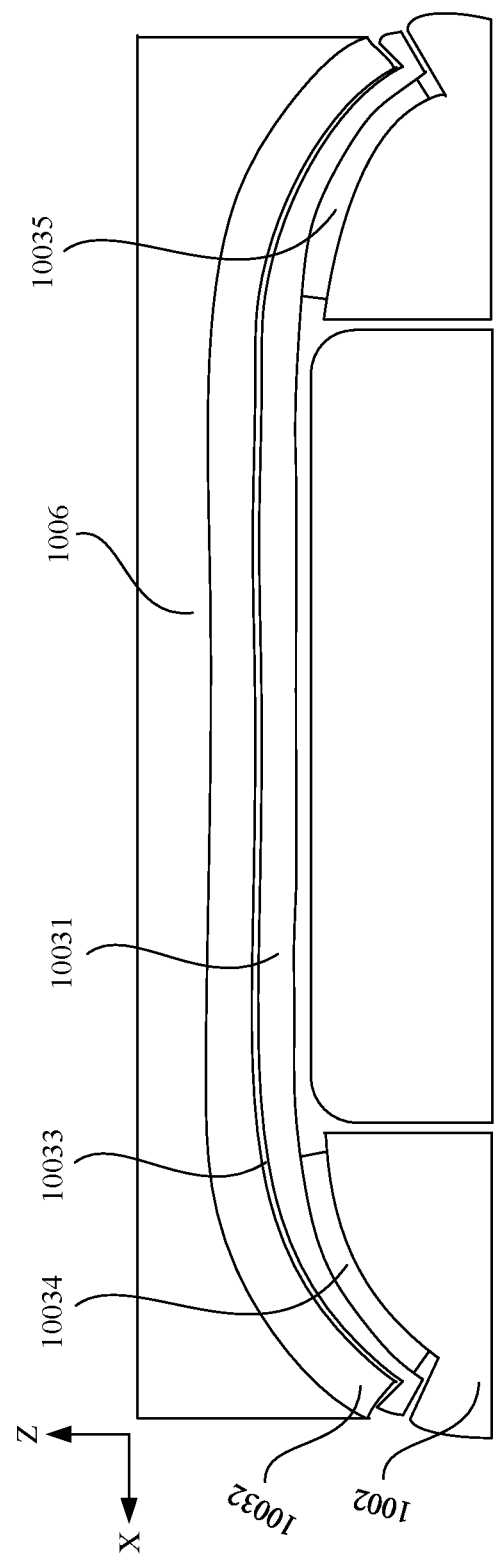
Figure 10C:
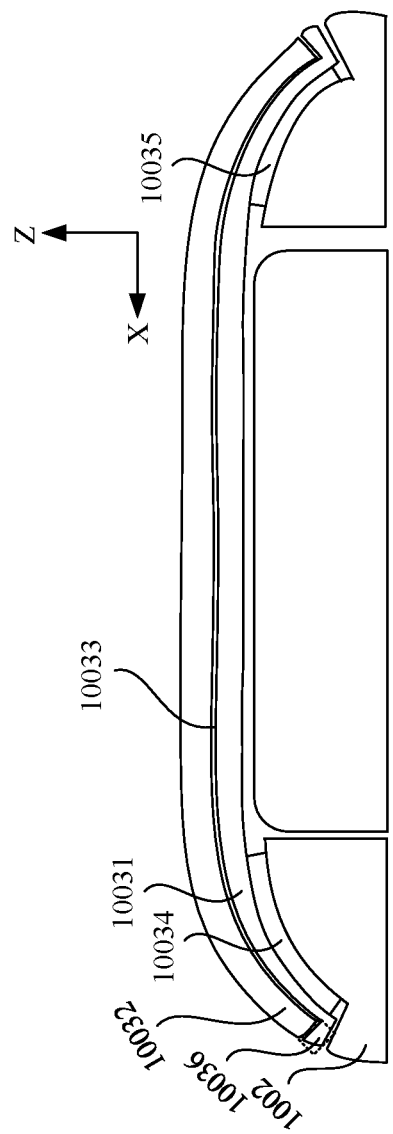

In addition to the manner shown in FIG. 9 in which the thickness of the edge of the vegan leather on the back cover is thinned, the vegan leather on the back cover may be thinned as a whole. FIG. 10*a* to 10*c* are exemplary schematic diagrams of a hot stamping process of the vegan leather as a whole. FIG. 10*a* to 10*c* are schematic diagrams of an X-Z cross-section of a back cover. FIG. 10*a* is a schematic diagram of a structure of the back cover before hot stamping. The back cover is of a composite layer structure of an unequal-thickness fiber composite board 10031 and vegan leather 10032. The fiber composite board 10031 and the vegan leather 10032 are bonded and fixed by using an adhesive layer 10033. The fiber composite board 10031 and a middle frame 1002 are fixed and bonded by using a first double-sided tape 10034 and a second double-sided tape 10035. A thickness of the unequal-thickness fiber composite board 10031 gradually becomes thicker from two edges of the middle frame 1002 to left and right edges of a battery 1005. A region of the unequal-thickness fiber composite board 10031 that is corresponding to the battery is of equal thickness. The vegan leather 10032 of equal thickness covers an outer surface of the unequal-thickness fiber composite board 10031. As shown in FIG. 10*b*, the vegan leather 10032 as a whole is a to-be-stamped region. After a stamping die 1006 covers the vegan leather 10032, hot stamping is performed on the vegan leather 1003 as a whole. FIG. 10*c* is a schematic diagram of a structure of the hot stamped back cover. Compared with the vegan leather 10032 in FIG. 10*a*, the vegan leather 10032 herein is thinned as a whole. As shown in FIG. 10*c*, the first structure layer is provided with a protrusion 10036 near the outer edge of the middle frame. The protrusion 10036 is a part circled by a dashed line in FIG. 10*c*. An upper surface of the protrusion 10036 transitions smoothly with an embossed upper surface of the cover layer. The protrusion provided at the edge of the first structure layer can clamp the embossed cover layer, which can improve adhesive firmness between the cover layer and the first structure layer. The upper surface of the protrusion transitions smoothly with the upper surface of the cover layer embossed as a whole, which can improve smoothness of the outer surface of the back cover.

The vegan leather 10032 is used as the cover layer of the back cover, and the vegan leather 10032 may alternatively be replaced with polyurethane, PU for short, genuine leather, bamboo leather, or another material. A preset pattern may be further hot stamped on the to-be-stamped region of the vegan leather 10032 by using the stamping die.

In this optional manner of hot stamping the vegan leather as a whole on the outer surface of the back cover, not only a thickness of a back cover edge can be reduced, but also a whole thickness of the back cover can be reduced, thereby reducing the whole thickness of the electronic device. A manner of performing hot stamping on the vegan leather may be further applied to a 2D back cover. By performing hot stamping on a partial region of vegan leather on an outer surface of the 2D back cover, a 2.5D effect can be presented on the back cover.

Figure 11A:
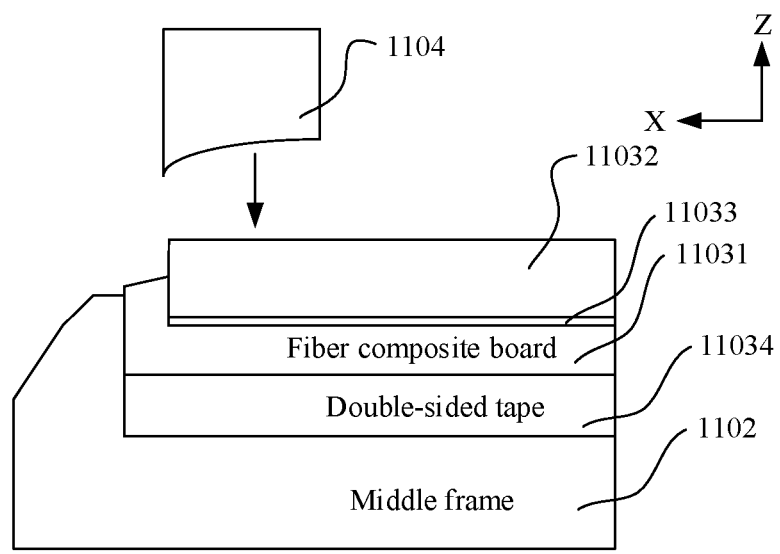
FIG. 11a and FIG. 11b are exemplary schematic diagrams of a hot stamping process of a 2D back cover.
Figure 11B:
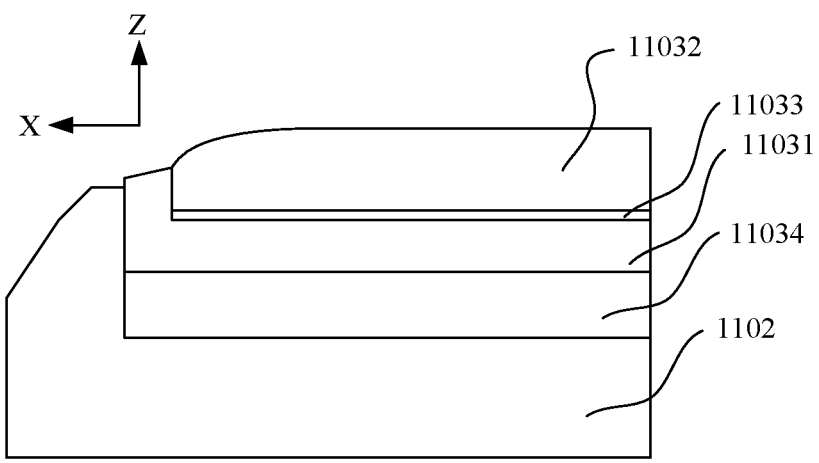

FIGS. 11*a* and 11*b* are exemplary schematic diagrams of a hot stamping process of the 2D back cover. FIGS. 11*a* and 11*b* are schematic diagrams of an X-Z cross-section of the back cover. Specifically, FIG. 11*a* is a schematic diagram of a location relationship between the 2D back cover and a stamping die. FIG. 11*b* is a schematic diagram of a structure of a stamped 2.5D back cover. As shown in FIG. 11*a*, the 2D back cover includes a fiber composite board 11031 and vegan leather 11032. The fiber composite board 11031 is bonded to the vegan leather 11032 by using an adhesive layer 11033. When the 2D back cover is disposed in a middle frame 1102, the fiber composite board 11031 is fixed and bonded to the middle frame 1102 by using a double-sided tape 11034. A stamping die 1104 is placed on an edge region of the vegan leather near the middle frame 1102 to perform hot stamping. A region in which an edge of the vegan leather 11032 is hot stamped by the stamping die is a third region. FIG. 11*b* is a schematic diagram of a structure of the stamped back cover. A thickness of the third region of the vegan leather gradually changes. A shorter distance between the vegan leather in the third region and the middle frame indicates a thinner thickness. An edge of the vegan leather 11032 of the 2D back cover is smooth, which presents the 2.5D effect. It should be noted that, a stamping tool may further hot stamp a preset pattern in a to-be-stamped region of the vegan leather 11032, for example, a personalized customized pattern or a mobile phone brand logo.

A hot stamping process is performed on the edge of the vegan leather on the 2D back cover to obtain the 2.5D effect of the back cover, which helps to shape a better back cover, and can further weaken a scraping feeling of the back cover.

It should be noted that, in addition to a cover layer of genuine leather, bamboo leather, vegan leather, or the like, a decorative layer, a ceramic layer, or the like may be disposed on the outer surface of the first structure layer. The decorative layer includes a coating layer. The coating layer is a solid continuous film obtained by application of a coating, and has effects of protection, insulation, decoration, and the like. A material of the coating layer may include but is not limited to chromium nitride, titanium nitride, titanium carbonitride, titanium carbide, tungsten carbide carbon film, and the like. The decorative layer serves to decorate the back cover of the electronic device.

The following still uses an example in which the first structure layer is a fiber composite board to describe a back cover of a composite structure of the first structure layer and the ceramic layer. A single ceramic back cover and an adhesive surface of the middle frame of the electronic device needs to be in good control surface shapes, to implement a good adhesive and sealing effect. Consequently, a numerical control machining of the single ceramic back cover has high precision and is time-consuming. In an embodiment of this application, a back cover is prepared by attaching a fiber composite board on a ceramic inner surface, so as to resolve a problem that the numerical control machining of the single ceramic back cover has high precision and is time-consuming.

Figure 12:
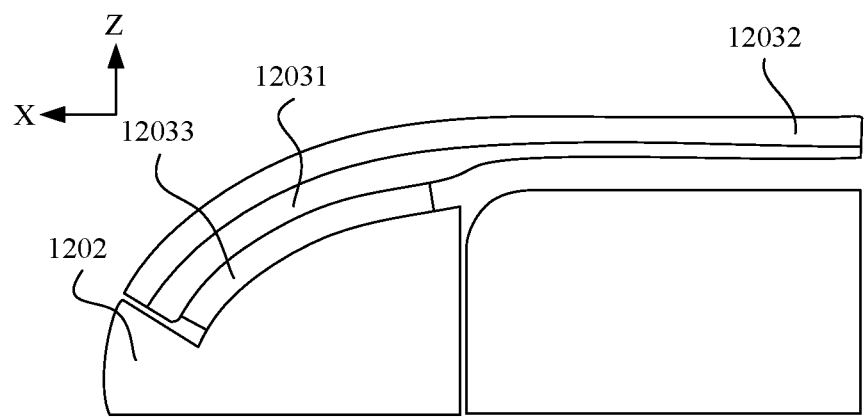
FIG. 12 is an exemplary schematic diagram of a structure of a ceramic back cover of an electronic device.

FIG. 12 is an exemplary schematic diagram of a structure of a ceramic back cover of an electronic device. FIG. 12 is a schematic diagram of an X-Z cross-section of the back cover. The ceramic back cover includes a fiber composite board 12031 and a ceramic layer 12032. The fiber composite board 12031 is bonded to a middle frame 1202 of the electronic device by using a double-sided tape 12033. A process procedure of attaching the fiber composite board 12031 and the ceramic layer 12032 may be as follows: Hot pressing processing is performed on a precursor of the fiber composite board 12031 by using a preset mold, to prepare a molded adhesive surface. Then, the adhesive surface is attached to inside of the ceramic layer 12032, to complete attaching of the two. This manner in which the fiber composite board is attached to the ceramic layer requires low machining accuracy of a bonding surface of the ceramic layer. This can reduce time and manual costs of numerical control machining of the bonding surface of the ceramic layer. After the molded adhesive surface is prepared, the fiber composite board 12301 may be directly hot pressed onto an inner surface of the ceramic layer 12302, so that bonding is implemented by a molecular force between the fiber composite board and the ceramic layer. In addition, the molded adhesive surface of the fiber composite board 12301 may also be bonded to the inner surface of the ceramic layer 12302 by using an adhesive or a double-sided tape.

The precursor is a composition of a resin matrix and a reinforcement, for example, a fiber reinforced resin, where the resin matrix is impregnated with continuous fibers or fabrics under a strictly controlled condition. Hot pressing means that a prepared composition is pressed with a preset mold at a preset temperature to obtain a molded fiber composite board, and finally, the press-molded fiber composite board is cured to obtain a final required fiber composite board. Both the preset temperature and a shape of the preset mold during hot pressing may be flexibly set by a person skilled in the art based on an actual requirement. This is not specifically limited in this embodiment of this application.

As shown in FIG. 12, the inner surface of the ceramic layer 12032 is attached with the fiber composite board 12301 as a whole. The fiber composite board 12301 attached to the inner surface of the ceramic layer 12032 is of unequal thickness. A thickness of a first region of the fiber composite board 12301 is greater than a thickness of a second region thereof. The first region is a region in which the fiber composite board is bonded and fixed to the middle frame of the electronic device. The second region is a region in the fiber composite board except the first region. The fiber composite board 12301 is thin in center and thick in edge. Because reliability of the single ceramic back cover is weak in four corners, rigidity of the four corners of the ceramic back cover can be enhanced by attaching the fiber composite board with a thin center and a thick edge to inside of the single ceramic layer. This improves whole reliability of the ceramic back cover.

Figure 13:
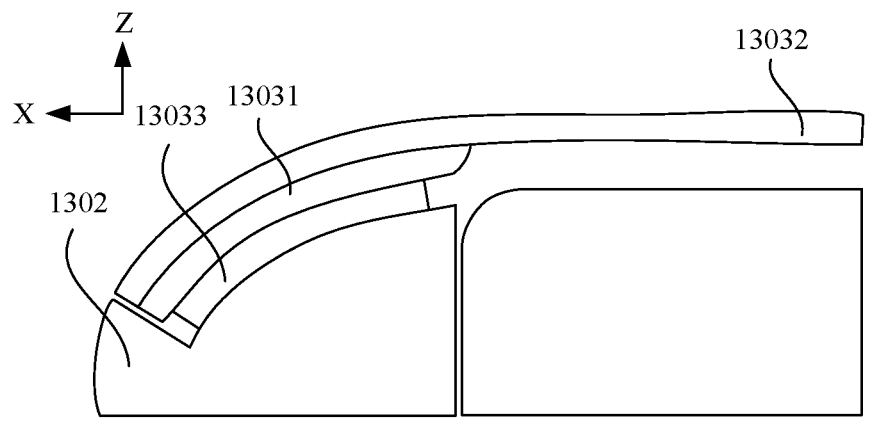
FIG. 13 is an exemplary schematic diagram of a structure of a ceramic back cover of an electronic device.

FIG. 13 is an exemplary schematic diagram of a structure of a ceramic back cover of an electronic device. FIG. 13 is a schematic diagram of an X-Z cross-section of the back cover. The ceramic back cover includes a fiber composite board 13031 and a ceramic layer 13032. The fiber composite board 13031 is bonded to a middle frame 1302 of the electronic device by using a double-sided tape 13033. An inner surface of the ceramic layer 13032 is not all attached with the fiber composite board. Instead, a hollow fiber composite board 13301 is attached to an inner surface edge of the ceramic layer 13032. A hollow size and shape of the fiber composite board may be set by a person skilled in the art based on an actual requirement.

Because reliability of the single ceramic back cover is weak in four corners, rigidity of the four corners of the ceramic back cover can be improved by attaching an annular fiber composite board to an inner edge of the single ceramic layer. This improves whole reliability of the ceramic back cover. Thicknesses of the ceramic back cover and the annular fiber composite board may be set by a person skilled in the art based on an actual requirement. In addition, the annular fiber composite board may also be prepared to have an unequal thickness structure. For example, when a distance to the frame is smaller, the thickness of the fiber composite board is thicker. In addition, fiber composite boards may be attached only to the four corners of the ceramic layer.

The embodiments of this application are described with reference to the accompanying drawings. However, this application is not limited to the foregoing specific implementations. The foregoing specific implementations are merely examples, rather than restrictive. A person of ordinary skill in the art can make many forms without departing from the object and the scope of the claims of this application and are within the protection scope of this application.

The invention claimed is:

1. A back cover of an electronic device, comprising:
   a first structure layer, wherein the first structure layer comprises a first region and a second region, and a first thickness of the first region is greater than a second thickness of the second region,
   wherein the second region forms a second region orthographic projection along a thickness direction of the electronic device, a battery of the electronic device forms a battery orthographic projection along the thickness direction of the electronic device, the second region orthographic projection comprises the battery orthographic projection, and upper surfaces of the first region and the second region are located on a same horizontal plane,
   wherein the first region is a fiber composite board, and the second region is a metal substrate,
   wherein the first region includes a first subregion and a second subregion, and the second region is between the first subregion and the second subregion, and wherein an overlapped region between the first region and the second region is fixedly connected.

2. The back cover of claim 1, wherein the overlapped region between the first region and the second region is bonded and fixed by an adhesive.

3. The back cover of claim 1, wherein the overlapped region between the metal substrate and the fiber composite board is locally corroded.

4. The back cover of claim 1, wherein the overlapped region between the metal substrate and the fiber composite board is locally dug.

5. The back cover of claim 1, wherein a thickness range of the metal substrate is 0.15 mm to 0.3 mm.

6. The back cover of claim 1, wherein the first region of the first structure layer is a region bonded and fixed with a middle frame of the electronic device.

7. The back cover of claim 6, wherein the first thickness of the first region gradually changes, and wherein the first thickness of the first region is thicker when the first region is farther from an outer edge of the middle frame.

8. The back cover of claim 7, wherein a thickness range of an outer edge of the first region is 0.15 mm to 0.45 mm.

9. The back cover of claim 1, wherein the back cover further comprises a second structure layer, and wherein the second structure layer is located on an outer surface of the first structure layer.

10. The back cover of claim 9, wherein the second structure layer is a cover layer, and wherein the cover layer and the first structure layer are bonded and fixed by using an adhesive layer.

11. The back cover of claim 10, wherein a third thickness of a third region of the cover layer gradually changes, the third region is in a predetermined distance away from an outer edge of a middle frame, the third region is a local region of the cover layer that is hot stamped by a stamping die, and the third thickness of the third region is thicker when the third region is farther from the outer edge of the middle frame.

12. The back cover of claim 11, wherein the first structure layer is provided with a protrusion near the outer edge of the middle frame, and wherein an upper surface of the protrusion transitions smoothly with an embossed upper surface of the third region of the cover layer.

13. An electronic device, comprising:
a middle frame;
a display screen; and
a back cover,
wherein the back cover comprises a first structure layer,
wherein the first structure layer comprises a first region and a second region, and a first thickness of the first region is greater than a second thickness of the second region,
wherein the second region forms a second region orthographic projection along a thickness direction of the electronic device, a battery of the electronic device forms a battery orthographic projection along the thickness direction of the electronic device, the second region orthographic projection comprises the battery orthographic projection, and upper surfaces of the first region and the second region are located on a same horizontal plane,
wherein the first region is a fiber composite board, and the second region is a metal substrate,
wherein the first region includes a first subregion and a second subregion, and the second region is between the first subregion and the second subregion, and
wherein an overlapped region between the first region and the second region is fixedly connected.

14. The electronic device of claim 13, wherein the overlapped region between the first region and the second region is bonded and fixed by an adhesive.

15. The electronic device of claim 13, wherein the overlapped region between the metal substrate and the fiber composite board is locally corroded.

16. The electronic device of claim 13, wherein the overlapped region between the metal substrate and the fiber composite board is locally dug.

17. The electronic device of claim 13, wherein the first region of the first structure layer is a region bonded and fixed with the middle frame.

18. The electronic device of claim 17, wherein the first thickness of the first region gradually changes, and wherein the first thickness of the first region is thicker when the first region is farther from an outer edge of the middle frame.

19. The electronic device of claim 13, wherein the back cover further comprises a second structure layer, and wherein the second structure layer is located on an outer surface of the first structure layer.

20. The electronic device of claim 19, wherein the second structure layer is a cover layer, and wherein the cover layer and the first structure layer are bonded and fixed by using an adhesive layer.

* * * * *